(12) United States Patent
Coakley et al.

(10) Patent No.: US 9,784,330 B2
(45) Date of Patent: Oct. 10, 2017

(54) AIR SPRING

(75) Inventors: John Fitzgerald Coakley, New Mills (GB); Andrew Stephen Elliott, Chorlton (GB)

(73) Assignee: Carbon Air Limited, Salford (GB)

( * ) Notice: Subject to any disclaimer, the term of this patent is extended or adjusted under 35 U.S.C. 154(b) by 1168 days.

(21) Appl. No.: 13/879,915

(22) PCT Filed: Oct. 21, 2011

(86) PCT No.: PCT/GB2011/052044
§ 371 (c)(1),
(2), (4) Date: Jul. 2, 2013

(87) PCT Pub. No.: WO2012/052776
PCT Pub. Date: Apr. 26, 2012

(65) Prior Publication Data
US 2016/0186829 A1 Jun. 30, 2016

(30) Foreign Application Priority Data

Oct. 21, 2010 (GB) .................................. 1017808.5

(51) Int. Cl.
*F16F 9/00* (2006.01)
*F16F 9/04* (2006.01)
(Continued)

(52) U.S. Cl.
CPC .............. *F16F 9/003* (2013.01); *B60G 15/08* (2013.01); *F16F 9/0472* (2013.01); *F16F 9/05* (2013.01); *B60B 19/00* (2013.01); *B60C 17/06* (2013.01)

(58) Field of Classification Search
CPC .......... F16F 9/003; F16F 9/0472; F16F 9/057; F16F 9/05; F16F 9/052; F16F 9/049;
(Continued)

(56) References Cited

U.S. PATENT DOCUMENTS

| 4,194,891 A | 3/1980 | Earls |
| 4,509,730 A * | 4/1985 | Shtarkman ................ F16F 9/30 |
| | | 188/268 |

(Continued)

FOREIGN PATENT DOCUMENTS

| CA | 1246464 | 12/1988 |
| CA | 1246464 | 3/2007 |

(Continued)

OTHER PUBLICATIONS

Decision of Rejection of Japanese Patent Application No. 2013-534390 dated May 10, 2016.
(Continued)

*Primary Examiner* — Anna Momper
(74) *Attorney, Agent, or Firm* — Olive Law Group, PLLC

(57) ABSTRACT

There is provided an air spring for supporting a load, the air spring comprises a chamber for holding a pressurized gas in use, a load-bearing surface arranged to transmit a force from a load in use to the pressurized gas held in the chamber. Importantly, in order to lower the spring rate, the chamber contains a mass of adsorptive material. There is also provided a use of an adsorptive material for the purpose of lowering the spring rate of an air spring, including a gas strut and a pneumatic wheel. There is also provided a method of designing an air spring using an adsorptive material to lower the spring rate.

12 Claims, 12 Drawing Sheets

(51) Int. Cl.
*F16F 9/05* (2006.01)
*B60G 15/08* (2006.01)
*B60C 17/06* (2006.01)
*B60B 19/00* (2006.01)

(58) Field of Classification Search
CPC ... F16F 9/04; F16F 9/02; F16F 9/0209; B60B 15/08
See application file for complete search history.

(56) References Cited

U.S. PATENT DOCUMENTS

| | | | |
|---|---|---|---|
| 5,482,260 A * | 1/1996 | Schmidt | F16F 1/3605 267/141 |
| 5,894,874 A | 4/1999 | Yamagiwa et al. | |
| 6,303,060 B1 | 10/2001 | Lobo et al. | |
| 6,482,520 B1 * | 11/2002 | Tzeng | H01L 21/4871 165/905 |
| 6,851,665 B2 * | 2/2005 | McLaughlin | B60G 17/0408 267/64.19 |
| 8,297,262 B2 | 10/2012 | Lang | |
| 2004/0100005 A1 | 5/2004 | Mclaughlin | |
| 2005/0098931 A1 | 5/2005 | Schisler | |
| 2009/0188392 A1 | 7/2009 | Carruthers | |

FOREIGN PATENT DOCUMENTS

| | | |
|---|---|---|
| CN | 1176188 A | 3/1998 |
| CN | 2663729 Y | 12/2004 |
| CN | 2824994 Y | 10/2006 |
| CN | 101200562 A | 6/2008 |
| CN | 101291819 A | 10/2008 |
| DE | 7803501 U | 6/1978 |
| DE | 102008017703 A1 | 10/2009 |
| EP | 0604867 A1 | 6/1994 |
| EP | 0942194 B1 | 6/2003 |
| EP | 1939015 B1 | 11/2010 |
| GB | 1505479 A | 3/1978 |
| JP | 55125346 A | 9/1980 |
| JP | 2014715 A | 6/1988 |
| JP | H04-266508 A | 9/1992 |
| JP | H04254023 A | 9/1992 |
| JP | 5296277 A2 | 11/1993 |
| JP | H07-008118 A | 1/1995 |
| JP | 7-290914 * | 11/1995 |
| JP | 2011-303919 A | 11/1999 |
| JP | 2007-321936 A | 12/2007 |
| WO | 9007970 A1 | 7/1990 |
| WO | 97/07999 A1 | 3/1997 |
| WO | 2007/002479 A3 | 1/2007 |
| WO | WO 2010006167 A2 * | 1/2010 ............ B60G 15/14 |

OTHER PUBLICATIONS

Chinese Patent Office—Search Report regarding related Chinese Patent Application No. 2011800510530; issued Feb. 10, 2015; pp. 1-2.
PCT International Preliminary Report on Patentability for related PCT International Application No. PCT/GB2011/052044, filed Oct. 21, 2011, Applicant Carbon Air Limited.
Japanese Examination Report dated Nov. 24, 2016 from related Japanese Application No. 2013-534390.
Office Action dated Jun. 27, 2017 from Japanese Patent Office for Japanese Patent Application 2016-173374.

* cited by examiner

AIR SPRING

CROSS REFERENCE TO RELATED APPLICATIONS

This application is a 35 USC 371 application of International PCT Patent Application No. PCT/GB2011/052044 filed on Oct. 21, 2011, and further claims priority to GB 1017808.5 filed Oct. 21, 2010, the entire contents of both of which are hereby incorporated by reference herein.

BACKGROUND

Technical Field

The invention relates to an air spring. In particular, the invention relates to an air spring for use in vehicular or industrial applications to support a load, and includes gas struts and wheels.

Description of Related Art

Air springs were developed by Firestone® in the late 1930s as a more efficient spring, or vibration isolator, for use in vehicle suspension systems. See for example U.S. Pat. No. 2,208,537 which is incorporated herein by reference. Airide® springs, as the Firestone® air springs were named, provided the means for a suspension to reduce the amount of road shock and vibration transmitted into a vehicle.

In the early 1950s, after many years of experimentation and product development, air sprung buses went into production. The success of air springs in bus applications spurred new interest in truck and trailer applications, as well as industrial shock and vibration isolation uses, and actuator uses.

Consequently almost all buses and many trucks and trailers on the road today now ride on air springs. Air springs are becoming more common in automotive applications and in industrial applications too.

It is known that a direct relationship exists between the spring rate and natural frequency of an air spring and isolation effectiveness.

Generally, the lower the spring rate or natural frequency, the better the isolator.

For example, a double convoluted type air spring usually has a lower spring rate and natural frequency than a single convoluted type at a given pressure. It is known to lower the spring rate and natural frequency, and hence increase the isolation effectiveness, of an air spring by adding an auxiliary reservoir. Of course, there must be free flow of air between the air spring and the reservoir and the reservoir should be mounted as close as possible to the air spring.

Using reservoirs is expensive, bulky and heavy and increases maintenance costs of a load-bearing system.

The invention aims to lower the spring rate of an air spring while mitigating or eliminating one or more of the aforesaid disadvantages of the known art.

SUMMARY OF THE INVENTION

According to the present invention there is provided a use, method and air spring as set forth in the appended claims. Other features of the invention will be apparent from the dependent claims, and the description which follows.

According to the invention, there is provided a use of an adsorbent material in an air spring used to support a load in order to lower the spring rate. In one embodiment, it is desired also to make the spring rate more linear.

Also, there is provided a method of designing an air spring, the method comprising determining an amount of adsorptive material to place into a load-supporting chamber of the gas spring to achieve a desired reduction in the spring rate.

According to the invention, there is provided an air spring for supporting a load, the air spring comprising a chamber for holding a pressurised gas in use, a load-bearing surface arranged to transmit a force from a load in use to the pressurised gas, characterised in that the chamber contains a mass of adsorptive material to lower the spring rate of the air spring.

Here, the term "air spring" includes air springs, gas struts and pneumatic wheels, whether air or gas filled. Also, the term "pressurised" is held to mean at a pressure above atmospheric pressure. The term "spring rate" means the gradient of the force versus deflection curve of a spring.

The adsorptive material may comprise a granular material.

Preferably, the adsorptive material comprises an activated carbon. Preferably, the activated carbon has an N2 surface area in excess of 1500 m2/g. Preferably, the activated carbon is one of the following commercially available types: Chemviron® SRD 10-054, SRD 09-006 and SRD 09-010. Preferably, the activated carbon is Chemviron® SRD 10-054.

In one embodiment of the invention, the mass of activated carbon occupies a volume of the chamber equivalent to between 0.2% and 90% of the design volume of the air spring. Preferably, the mass of activated carbon occupies a volume of the chamber equivalent to one of between 5% and 75%, 10% and 50%, 15% and 40% and 30% and 40% of the design volume of the air spring.

Here, the term "design volume" means the volume of the chamber when the air spring is set at the manufacturer's recommended design position.

The air spring may comprise a barrier to contain the adsorptive material, wherein the barrier allows for fluid communication between the adsorptive material and the rest of the chamber. Preferably, the barrier is a gauze or mesh or filter grill sufficiently fine to keep the adsorptive material from entering the rest of the chamber. Preferably, the barrier is a flexible elastic membrane arranged to allow a net movement of gas into and out of the adsorptive material.

The air spring may comprise one or more restricted openings between the adsorptive material and the rest of the chamber. Here, the term "restricted opening" means an opening sufficiently small to create sufficient resistance to fluid flow to cause damping in the air spring.

Preferably, the chamber is pressurised and the load-bearing surface is attached to a load. Preferably, the chamber is pressurised to at least 1 barg (100 kPa above atmospheric pressure). Preferably, the chamber is pressurised to one of between 1 barg and 10 barg, 2 barg and 8 barg, 3 barg and 6 barg.

Preferably, the chamber is pressurised with air. However, in an alternative arrangement, the chamber may be pressurised with another gas, for example, a gas substantially consisting of carbon dioxide or a gas substantially consisting of nitrogen.

In an example embodiment, the air spring is a reversible sleeve air spring. Preferably, the piston contains the adsorptive material. In this case, a piston lid may be provided to contain the adsorptive material but allow fluid flow between the adsorptive material and the remaining chamber. The piston lid may comprise a gauze or mesh or filter grill for this purpose. Preferably, the piston lid is a flexible elastic membrane arranged to allow a net movement of gas into and out of the adsorptive material. Additionally, or alternatively, the piston lid may be an orifice plate defining an orifice.

Preferably, the orifice is protected from the adsorptive material by a substantially hemispherical mesh. Preferably, the orifice plate comprises an orifice rivet having the hemispherical mesh attached thereto. In this example embodiment, the piston is preferably filled with the adsorptive material to occupy approximately one third of the design volume of the air spring.

In a related example embodiment of the reversible sleeve air spring, the bellows comprises a casing for the adsorptive material, and the adsorptive material is contained within the casing. Preferably, the casing is arranged to occupy only space left in the bellows when the air spring is fully compressed. In one example, the casing is torroidal and is attached to the bellows, an upper bead plate, or both the bellows and the upper bead plate of the air spring. Preferably, the casing is attached with elastic members. In this example embodiment, the adsorptive material occupies up to a third of the design volume of the air spring, and preferably around 15% of the design volume of the air spring.

In another related embodiment of the invention, the piston and bellows both contain the adsorptive material as described above.

In an example embodiment, the air spring is a convoluted air spring. Preferably, the air spring comprises a bumper and the bumper contains the adsorptive material. Preferably, the bumper comprises at least one of a gauzed or meshed or filtered opening to allow fluid flow between the adsorptive material and the remainder of the chamber. Preferably, the bumper comprises a helical wall defining a spiral slot running around the bumper from top to bottom so creating a hollow bumper spring. Preferably, the hollow bumper spring comprises a gauze or mesh or filter barrier between the helical wall and the adsorptive material.

In an example embodiment, the air spring is a gas strut comprising a rod and the amount of adsorptive material additionally creates a more linear spring rate along the stroke of the gas strut. Preferably, the adsorptive material is contained within an end section of the gas strut opposite the rod. Preferably, the adsorptive material is contained by a gauze or mesh or filter grill to allow fluid flow between the adsorptive material and the remaining chamber. Preferably, the barrier is a flexible elastic membrane arranged to allow a net movement of gas into and out of the adsorptive material. Preferably, an orifice plate comprising an orifice is arranged to contain the adsorptive material. Preferably, the orifice is sufficiently small so as to cause sufficient resistance to fluid flow to cause damping in the gas strut.

In an example embodiment, the air spring is a wheel comprising a rim and a tyre, and the amount of adsorptive material reduces the spring rate to increase vibration isolation. Preferably, the amount of adsorptive material is between 20% and 30% of the chamber. Preferably, as much adsorptive material is used as possible without impeding the action of the tyre tread or wall, but generally this is expected to be around 30% of the volume of the chamber, the chamber in this embodiment being defined by the rim and tyre. Preferably, the adsorptive material is contained in segments which are circumferentially arranged with the chamber. Preferably, the adsorptive material is adjacent the rim. Preferably, a mesh spans across the rim to hold the adsorptive material in place. Preferably, the adsorptive material is held within a cloth casing.

In a slightly different embodiment, the wheel comprises a reinforcing ring attached to the rim to allow the wheel to operate when there is zero pressure in the wheel. The adsorptive material is contained within the reinforcing ring, and the reinforcing ring comprises at least one flow passage to allow fluid flow between the adsorptive material and the remainder of the chamber. Preferably, the at least one flow passage is an orifice which is sufficiently small so as to cause sufficient resistance to fluid flow to cause damping in the wheel. Preferably, the reinforcing ring is arranged in segments and at least one flow passage is arranged in each segment.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

Several embodiments of the invention are now described. The invention is first applied to a typical air spring. Then, the invention is applied to a gas strut, and finally a pneumatic wheel. All of these devices are considered to be air springs for the purposes of explaining and claiming the invention.

Figure 1:
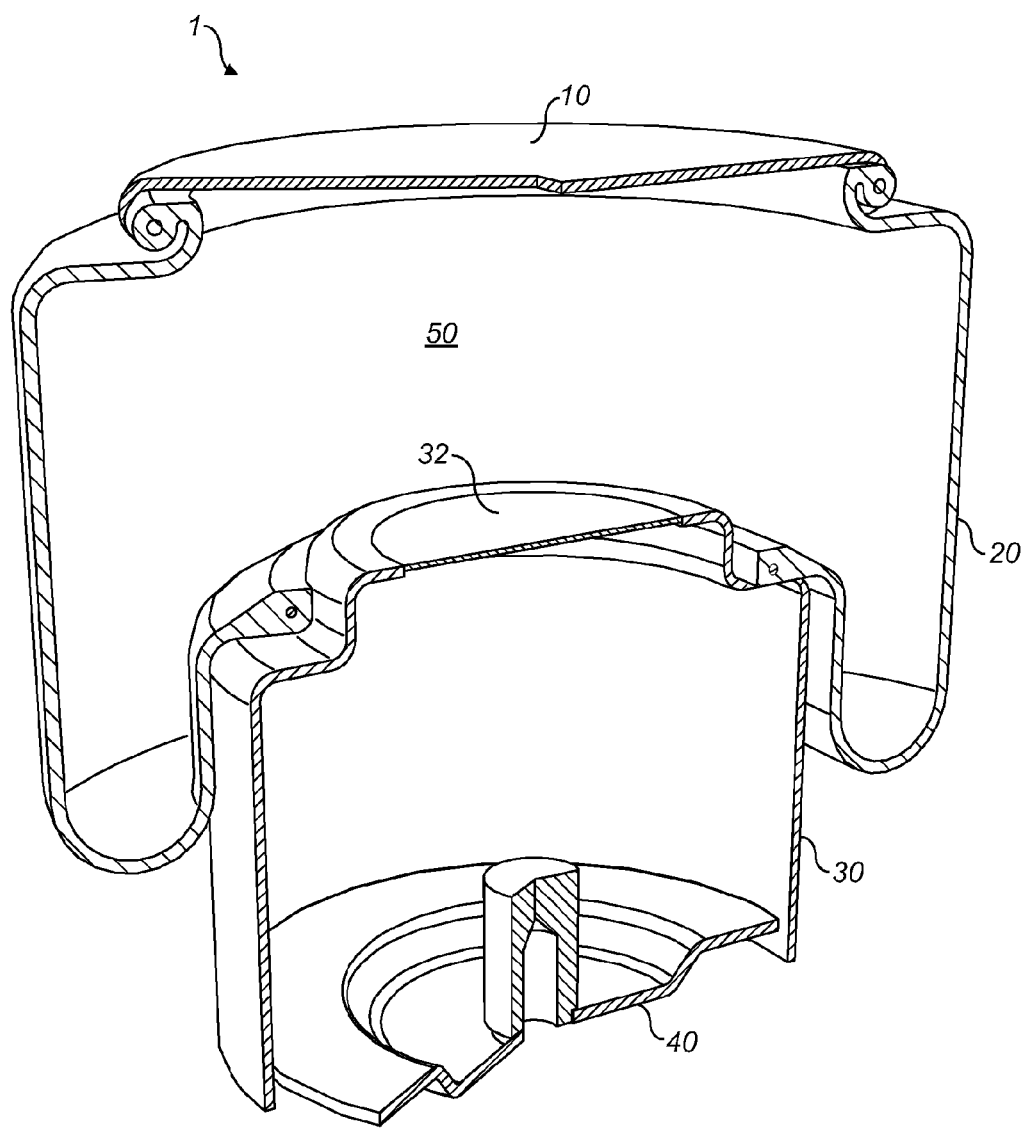
FIG. 1 is a cut-away perspective view of a reversible sleeve air spring.

FIG. 1 shows an air spring 1, and in particular shows a reversible sleeve or rolling lobe air spring. The air spring 1 comprises an upper bead plate 10, a bellows 20 and a piston 30 having a lower surface (for ease of description called a lower bead plate 40 herein), as would be known to the normal designer of air springs. A chamber 50 is defined by the upper bead plate 10, the bellows 20 and the piston 30, and normally contains pressurised gas to support a load in use. An air inlet (not shown) is often used to connect a source of pressurised gas or an exhaust to the chamber 50 so that the internal pressure of the chamber and height of the air spring may be controlled. One advantage of an air spring is that its height can be adjusted to suit a particular application or need. A load (not shown) is usually attached to one of the upper bead plate 10 or the lower bead plate 40 via respective mounting plates (not shown). A piston lid 32 separates the piston 30 from the chamber 50.

According to the invention, use is made of an adsorptive material in such a way so as to lower the spring rate and natural frequency of the air spring 1. Lowering the spring rate and natural frequency of the air spring 1 increases the isolation effectiveness of the air spring 1. In vehicular applications a smoother ride is achieved. In industrial applications better vibration shielding or isolation is achieved. In gas strut applications, a more linear spring rate is achieved.

In particular, a mass of adsorbent material is placed inside the chamber 50 so as to lower the spring rate and natural frequency of the air spring 1. The adsorbent material is arranged within the chamber 50 in such a way so as to avoid blocking the air inlet (not shown) and to avoid unduly snagging or restricting the action of the bellows 20 or any moving part of the air spring 1.

Figure 2:
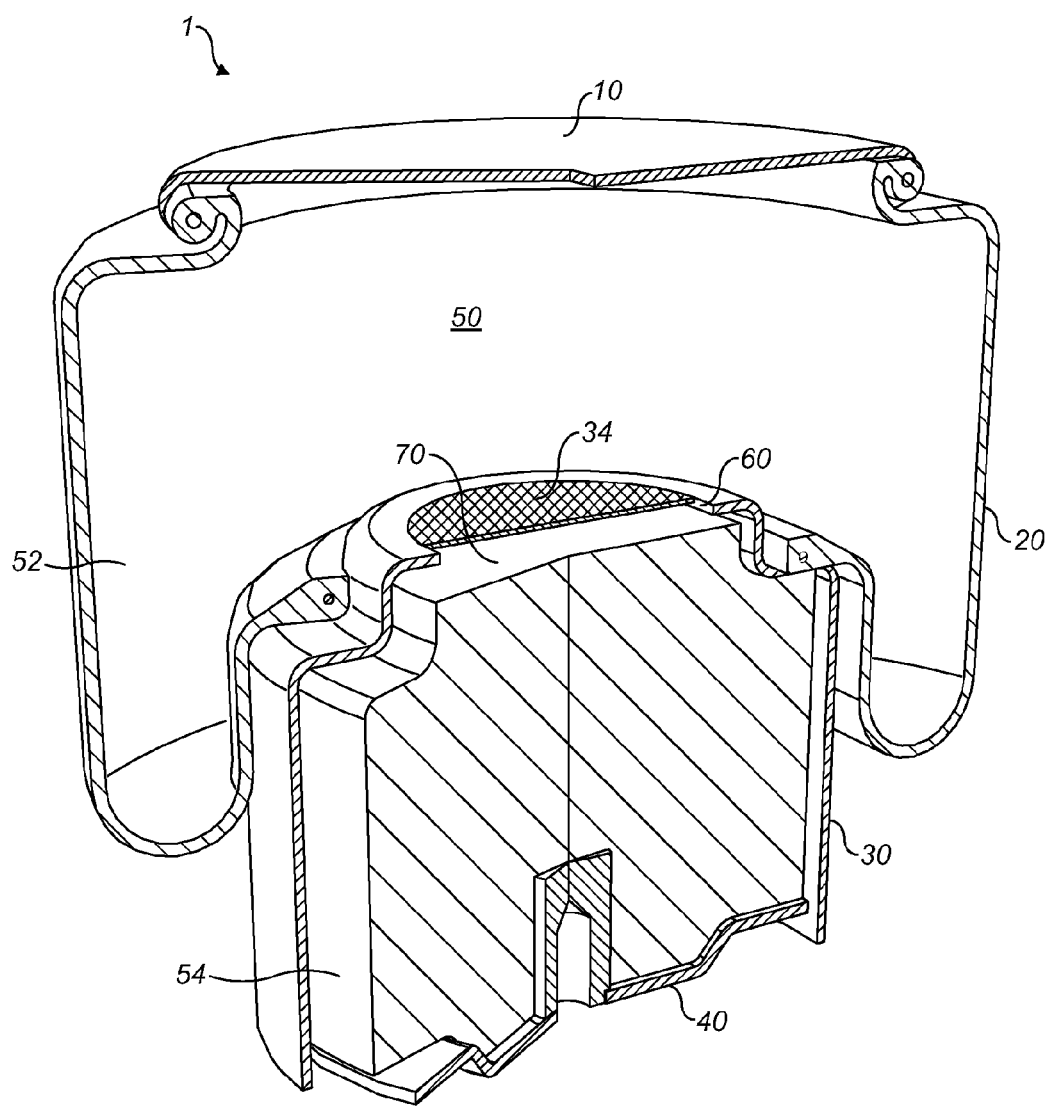
FIG. 2 is a cut-away perspective view of a reversible sleeve air spring according to a first embodiment of the invention.

A first illustrative embodiment of the invention is described with reference to FIG. 2, which shows a modified version of the reversible sleeve air spring 1 of FIG. 1. Here, the air spring 1 has a flow passage 60 arranged to allow air to move into the piston 30. The chamber 50 is effectively sub-divided into two sub-chambers 52, 54. The first sub-chamber 52 is generally within the bellows 20 and has a volume which changes in use. The second sub-chamber 54 is generally within the piston 30 and has a fixed volume. To achieve the invention, the piston 30 or second sub-chamber 54 is at least partially filled with the mass of adsorptive material 70.

The amount of adsorptive material 70 should be chosen to effect the desired reduction in spring rate and natural frequency. In this first illustrative embodiment, the whole of the piston 30 or second sub-chamber 54 is filled with adsorptive material. However, any amount of adsorptive material occupying between 5% and 100% of the piston volume would bring about an improvement.

More information as to why the adsorptive material lowers the spring rate and natural frequency of the air spring 1 is given later in this document.

A modified piston lid 34 is used to contain the adsorptive material 70 in the second sub-chamber 54. The modified piston lid 34 includes a fine gauze or industrial filter fabric portion to allow fluid communication of the air between the first sub-chamber 52 and the second sub-chamber 54.

Typically, the piston volume (second sub-chamber 54) occupies approximately one third of the design volume of the air spring 1. According to experimental results obtained by the applicant, completely filling the piston volume with adsorptive material results in the lowering (or relaxing) of the spring rate to two-thirds that of an empty air spring 1 at an internal pressure of 6 barg. In other words, filling approximately one third of the chamber 50 with the adsorptive material 70 results in the spring rate lowering by approximately one third at a pressure of 6 barg. To achieve a spring rate relaxation of one third using known techniques requires the addition of an extra half again in volume to the chamber 50, via a reservoir. As a result of the addition of the adsorptive material 70, the vibration isolation is improved per unit size of air spring 1. Or, looking at the contribution of the invention another way, a much smaller air spring 1 may be used for a given purpose while achieving the same vibration isolation. Suspension systems using air springs 1 according to the invention may therefore be better performing or smaller, and may be cheaper and easier to install and maintain compared with conventional air springs.

The applicant has also observed that the degree of relaxation of spring rate falls off with increased frequency of operation. For example, a relaxed spring rate of 71% of normal (that is, when compared to an identical air spring 1 not having the adsorptive material 70), was observed at 1 Hz and 6 barg. A relaxed spring rate of 77% was observed at 10 Hz and 6 barg. The applicant considers this limitation to the effect of the adsorptive material 70 on spring rate to be a result of a limitation to the adsorption rate of the adsorptive material 70.

The applicant has also observed that the degree of relaxation of spring rate increases with lower pressure. For example, a relaxed spring rate of 55% was observed at an internal pressure of 0.5 barg.

During testing and proof-of-concept experiments, the adsorptive material 70 was a well-activated carbon, and more particularly was Chemviron® SRD 09-006, SRD 09-010 and SRD 10-054. However, the applicant considers that any adsorptive material 70 would be suitable. In particular, porous adsorptive materials are considered to be suitable. For example, silica gels and zeolites are believed to be credible alternatives to activated carbon.

To counter the effect of the fall-off in relaxation with increasing frequency of operation, the applicant has observed that finer grain carbons, such as carbon powders, have an adsorption rate up to eight times faster than granular activated carbons.

Figure 3:
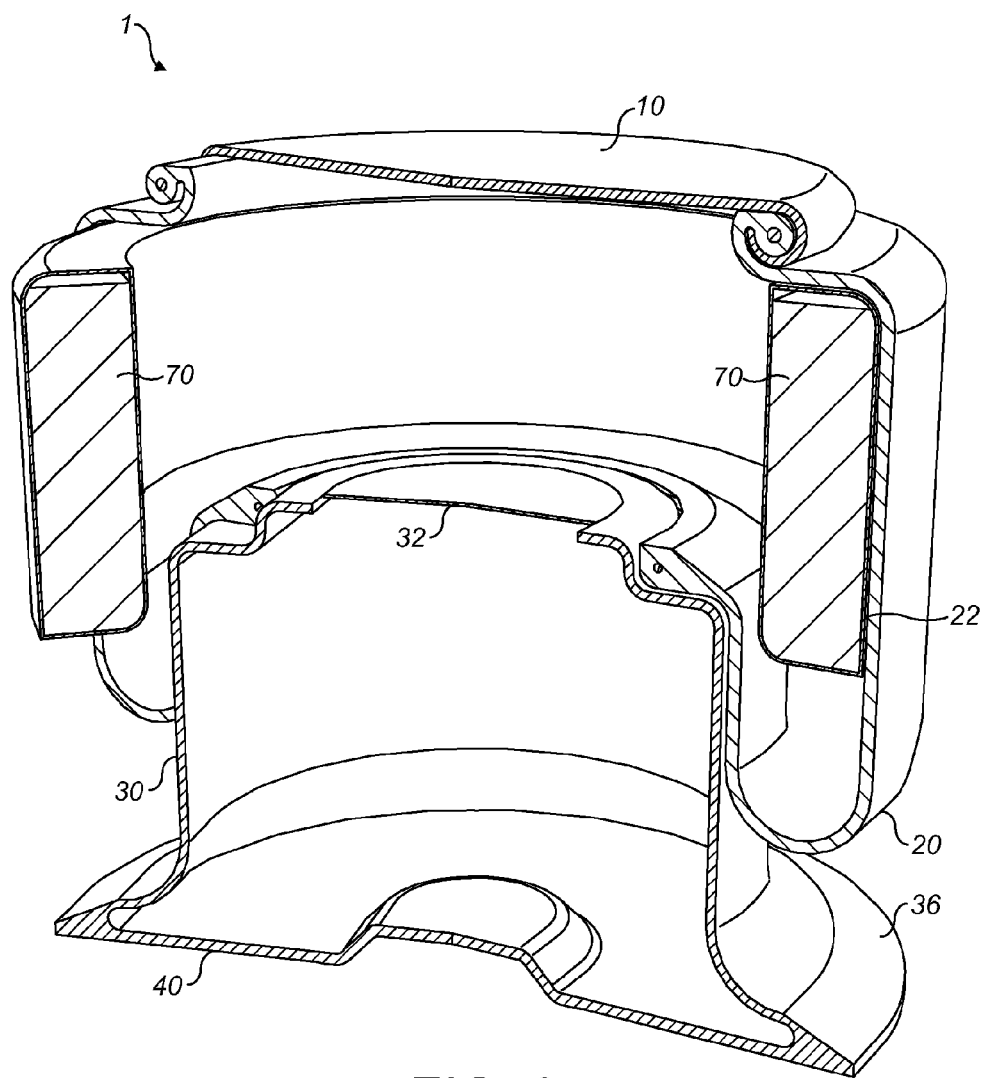
FIG. 3 is a cut-away perspective view of a reversible sleeve air spring according to a second embodiment of the invention.

A second illustrative embodiment of the invention is described with reference to FIG. 3, which shows a modified version of the reversible sleeve air spring 1 of FIG. 1. Here, unlike the first illustrative embodiment of FIG. 2, the piston 30 has a piston lid 32 as also shown in FIG. 1.

Instead of having the mass of adsorptive material in the piston 30, the mass of adsorptive material 70 is held in the chamber 50 outside of the piston 30 (the first sub-chamber 52 of FIG. 2) which in this example is defined by the upper bead plate 10, the bellows 20 and by the piston 30. A casing 72 containing the adsorptive material 70 is placed in the chamber 50 in such a way so as to avoid blocking the air inlet (not shown) and to avoid unduly snagging or restricting the action of the bellows 20 or any moving part of the air spring 1.

In particular, a torroidal or ring-like casing 72 is used to occupy substantially all of the space left empty in the bellows 20 when the air spring 1 is in a fully compressed state, although the casing 72 may be smaller and may be of other suitable shapes to prevent the adsorptive material 70 from being crushed, especially when the air spring 1 is being used in a purely axial motion.

The casing 72 is attached to the bellows 20 on an inner face 22 adjacent the upper bead plate 10 using elasticated ties (not shown). However, the casing 72 may be attached to an underside 24 of the bellows located adjacent the upper bead plate 10, or to the upper bead plate 10 itself, or to both the bellows 20 and the upper bead plate 10.

The casing 72 includes a fine gauze or industrial filter fabric portion to allow fluid communication of the air in the chamber 50 with the adsorptive material within the casing 72. In this example, the whole of the chamber-facing surface of the casing 72 consists of the fine gauze or industrial filter fabric. Such a configuration is particularly useful for lowering spring rate at higher frequencies. This usefulness is because smaller or finer adsorptive materials 70 can be used more effectively. In particular, the depth of the adsorptive material 70 will be restricted and a larger surface area of the material 70 will be in direct contact with the gas inside the chamber 50. The applicant has observed that high packing densities of smaller or finer adsorptive materials 70 cause a greater pressure drop when gas is cycling into and out of the mass of adsorptive material 70, meaning that a maximum effective depth is created, and the problem is overcome in this illustrative embodiment.

Again, the amount of adsorptive material 70 is chosen to effect the desired reduction in spring rate and natural frequency, within the physical limits of the air spring 1. In this example, the piston 30 has a flared end 36 expanding outwardly from the piston 30 at a lower end thereof adjacent the lower bead plate 40. The flared end 36 acts to increase the spring rate of the air spring 1 when the bellows 20 travels of the flared end 36, and an air spring designer must take this factor into account when determining the correct amount of adsorptive material 70 to include in the air spring 1.

Greater lowering of spring rate and natural frequency is achieved by filling as much of the chamber 50 with adsorptive material 70 as possible. Filling both the piston 30 (FIG. 2) and using the casing 72 (FIG. 3) achieves greater lowering of the spring rate. Therefore, the first and second embodiments of the invention shown in FIGS. 2 and 3 may be combined to increase the occupancy of the adsorptive material 70 in the air spring 1.

Such a combination may lead to the carbon content of the air spring 1 at its design height to increase from one third to approximately two thirds of the overall volume of the air spring 1. The applicant has observed that a relaxed spring rate of 50% is achieved at a pressure of 6 barg. To achieve this improvement using known techniques, the air spring volume would need to be doubled using an auxiliary reservoir.

Figure 4:
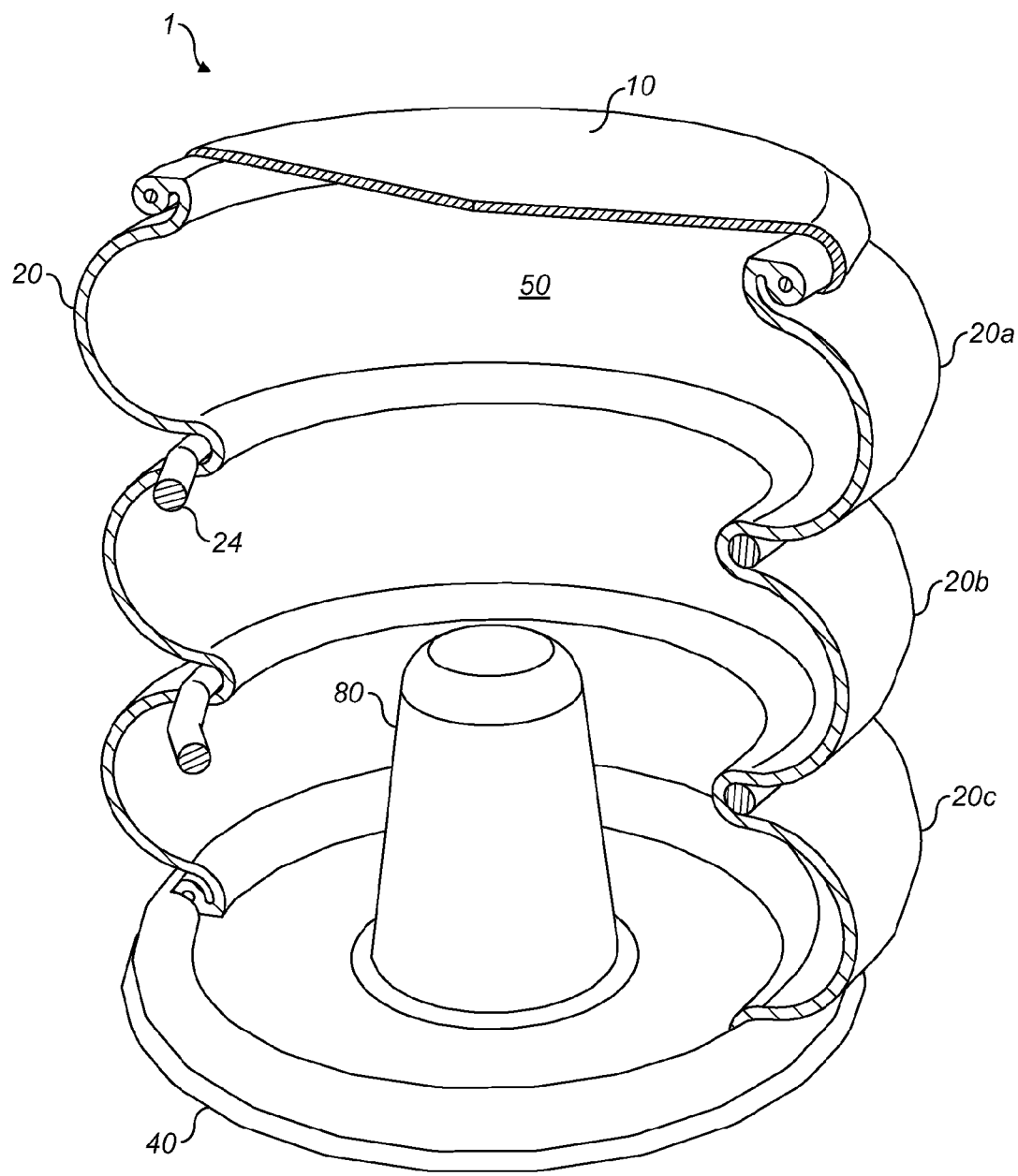
FIG. 4 is a cut-away perspective view of a convoluted air spring.

FIG. 4 shows a convoluted air spring 1, and in particular a triple-convoluted air spring. Once more, the air spring 1 comprises an upper bead plate 10, a bellows 20, and a lower bead plate 40, as would be known to the normal designer of air springs. In this case, the bellows 20 is sub-divided into three sub-bellows 20a, 20b, 20c by two girdle hoops 24. The chamber 50 is defined by the upper bead plate 10, the bellows 20 and the lower bead plate 40, and normally contains pressurised gas to support a load in use. An air inlet (not shown) is often used to connect a source of pressurised gas or an exhaust to the chamber 50 so that the internal pressure of the chamber may be controlled. A load (not shown) is usually attached to one of the upper bead plate 10 or the lower bead plate 40 via respective mounting plates (not shown).

In addition, the air spring 1 of FIG. 4 includes a optional bumper 80 which is used to protect the air spring 1 when no pressurised air or gas is in the air spring 1. Known bumpers 80 are made from solid rubber, plastics, or rubber and fabric materials. The bumper 80 is mounted on the lower bead plate within the chamber 50. The bumper takes up space within the chamber 50 known as the bumper volume, and causes the spring rate and natural frequency of the air spring 1 to rise.

Figure 5:
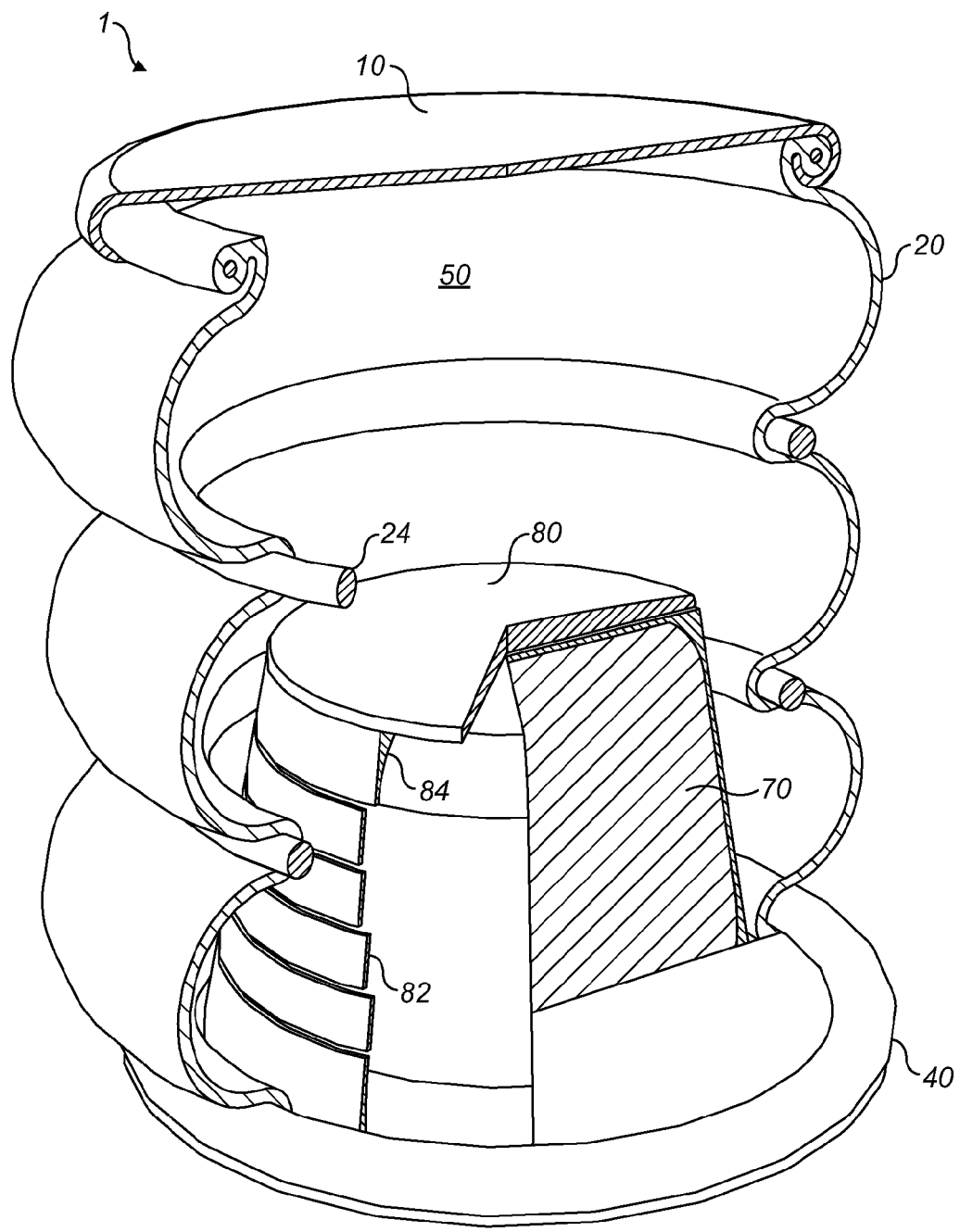
FIG. 5 is a cut-away perspective view of a convoluted air spring according to a third embodiment of the invention.

A third illustrative embodiment of the invention is described with reference to FIG. 5, which shows a modified version of the convoluted air spring 1 of FIG. 4. Here, the air spring 1 has a hollow bumper 80 which is at least partially filled with the mass of adsorptive material 70. The bumper 80 defines a flow passage which allows the adsorptive material 70 to be in fluid communication with the chamber 50. Again, as described with reference to the earlier embodiments, the air passage includes a fine gauze, mesh or industrial filter paper to contain the adsorptive material 70 in the bumper 80. In this particular illustrative embodiment, the bumper 80 comprises a helical side wall 82 defining a slot running along the helix to act as the air passage. The side wall is made of metal, and also acts as a bumper spring. A mesh 84 contains the adsorptive material 70.

In this way, the spring rate of the air spring 1 is lowered by the addition of the bumper 80 and adsorptive material 70, and the vibration isolation is improved. In this embodiment, it is unlikely that the bumper volume is going to be able to occupy as much as a third of the assembly volume of the air spring 1.

Figure 6:
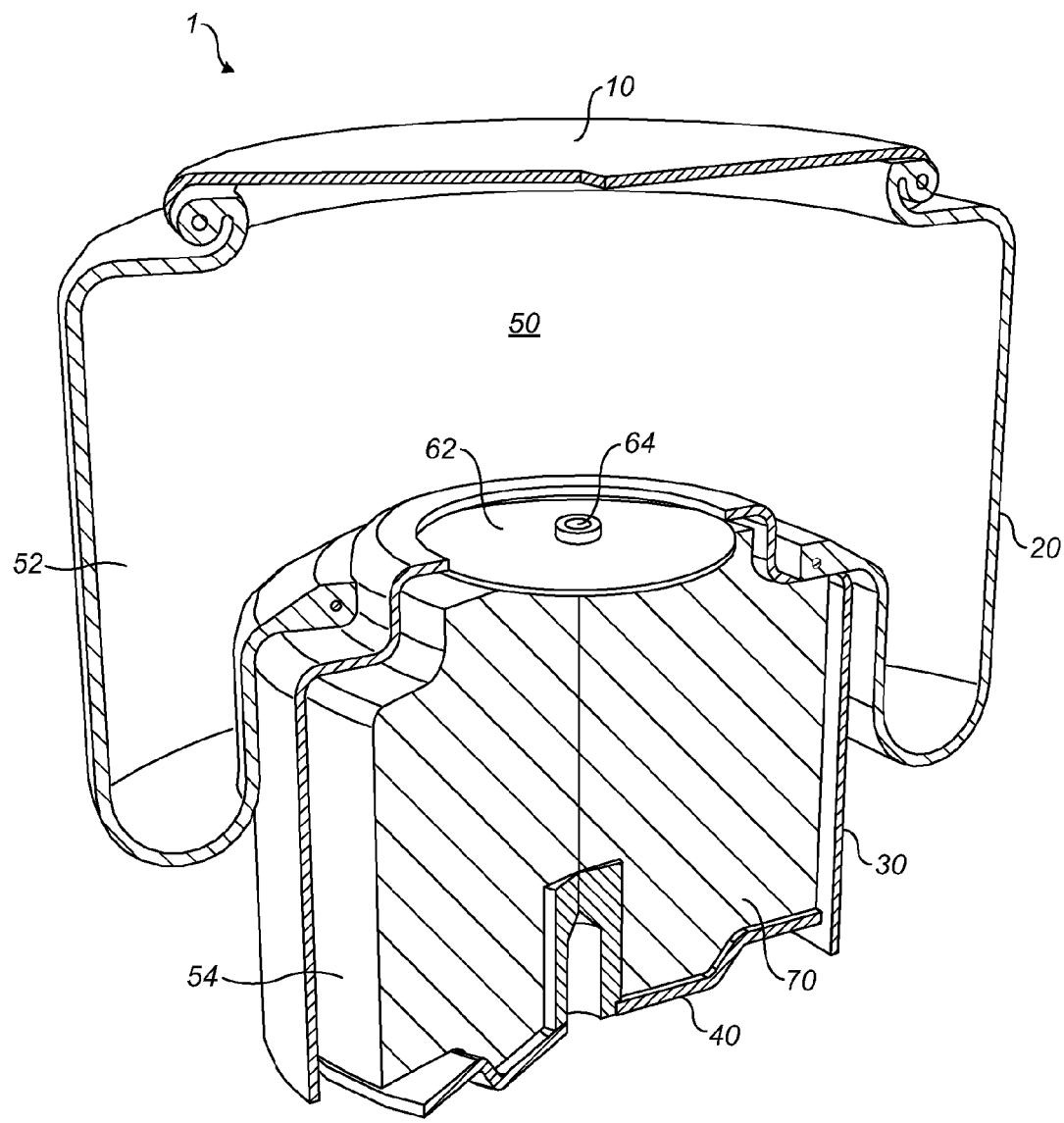
FIG. 6 is a cut-away perspective view of the reversible air spring of FIG. 2 modified to have an orifice plate according to a fourth embodiment of the invention.

A fourth illustrative embodiment of the invention is described with reference to FIG. 6, which shows a modified version of the reversible sleeve air spring 1 of FIG. 2. Only the differences between the first illustrative embodiment and the fourth illustrative embodiment are described. Here, the air spring 1 has an orifice plate 62 in place of the modified piston lid 34. The orifice plate 62 defines an orifice 64 which minimises the amount of gauze or industrial filter paper needed to separate the adsorptive material from the first sub-chamber 52. In other words, the area of the flow passage 60 is restricted.

The area of the flow passage 60 may be further restricted by having a relatively narrow orifice 64 so as to create sufficient resistance at higher flow rates to cause damping in the air spring 1. Such damping can attenuate the impact of a single or very low-frequency shock event, softening the shock, and additionally preventing the air spring 1 from bottoming out. The presence of the adsorptive material 70 is considered to augment the damping effect caused by the orifice 6, by the increased uptake of gas in the adsorptive material through adsorption/desorption.

The orifice 64 is protected from blockage by the adsorptive material 70 by an optional hemispherical mesh cage (not shown) on the piston side of the orifice plate 62.

Figure 7:
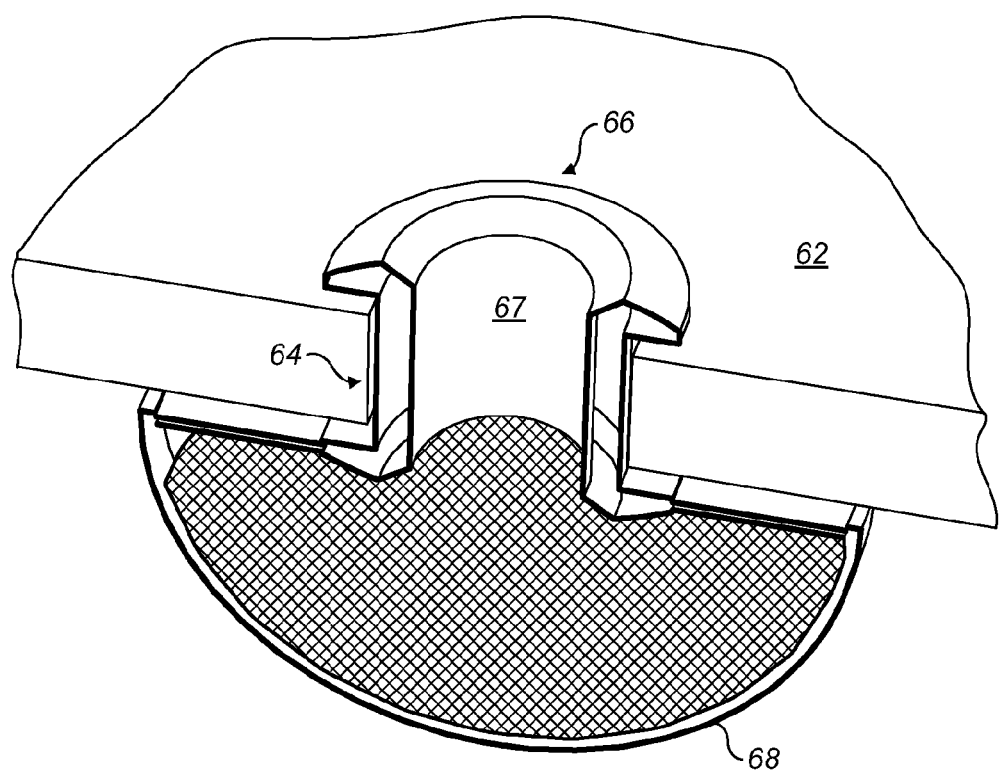
FIG. 7 is a cut-away perspective of a rivet according to a fifth embodiment of the invention.

A fifth illustrative embodiment of the invention is described with reference to FIG. 7 which shows an orifice rivet 66. The orifice rivet 66 comprises a throat 67 which acts as the flow passage 60 in this embodiment. The throat 67 connects to a substantially hemispherical cage 68 which is made from gauze. The orifice rivet 66 fits into the orifice 64, which may be pre-made in the orifice plate 62 or drilled or punched into an existing piston lid 32. In particular, the orifice rivet 66 is made from brass, but could be made from any other heat-conductive and dimensionally relatively constant material.

The fifth embodiment allows a simpler and standardised way of creating an orifice (or throat 67) in an air spring 1. This results in quicker production and lower costs of manufacture.

A sixth illustrative embodiment of the invention is described with reference to FIG. 8 which shows a gas strut 100. Here, the inventive contribution has been taken from the field of air springs and applied in the field of gas struts. Gas struts support a load and exhibit a spring rate. It is desirable for the spring rate in some applications to be as low as possible, or as linear as possible.

Figure 8:
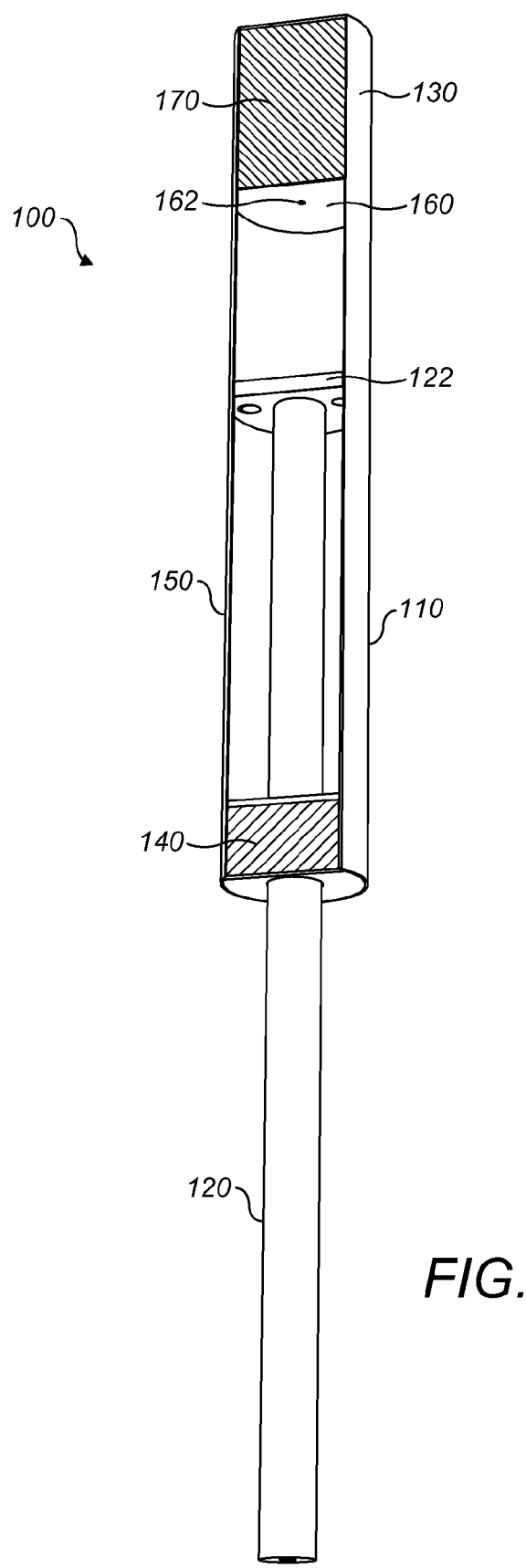
FIG. 8 is a cut-away perspective of a gas strut according to a sixth embodiment of the invention.

Referring to FIG. 8, the gas strut 100 comprises a body 110 and rod 120 as would be known to the skilled person. The rod 120 moves into and out of the body 110 in an axial manner and terminates within the body 110 at a plunger 122. The body 110 comprises an end section 130 at an end opposite the rod 120 and a seal 140 at an end adjacent the rod 120. The rod 120 enters the body 110 via the seal 140. In between the end section 130 and the seal 140 there is a sealed chamber 150, in which the plunger 122 is arranged to move in an axial direction along the length of the body 110. The seal 140 may be liquid-filled and prevents a gas contained in the chamber 150 from escaping. Often, the gas is pressurised.

A conventional gas strut has a spring rate more linear than a metal spring equivalent. Nonetheless, the spring rate increases as the plunger 122 approaches the end section 130 as the gas trapped in the end section 130 compresses (note that the plunger 122 is designed to allows some gas to pass, but the rod will occupy a growing proportion of the volume of the chamber 150 as the rod travels into the body 110 of the conventional gas strut, so increasing the pressure in the chamber 150 as the rod travels inwardly).

According to the sixth embodiment, the end section 130 is occupied by an adsorptive material 170, thereby lowering the spring rate of the gas strut 100. In other words, the gas strut 100 behaves as if it is longer than it actually is. In practice, this means that the spring rate can be more linear across the whole of the stroke of the rod 120 and plunger 130. Looking at the contribution another way, the same gas strut performance can be obtained by a physically smaller gas strut. The smaller gas strut could be shorter where previously redundant stroke was used, or narrower where extra volume was necessary to compensate for the rod 120 taking up the volume of the chamber 150.

In this embodiment, the end section 130 is also provided with an orifice plate 160 for containing the adsorptive material 170. The orifice plate 160 comprises an orifice 162 for damping the stroke of the rod 120 and plunger 130. Damping is achieved by restricting the flow of gas into and out of the adsorptive material 70 contained in the end section 130.

A seventh illustrative embodiment of the invention is described with reference to FIG. 9 which shows a cut-away view of a wheel 200. Here, the inventive contribution has been taken from the field of air springs and gas struts and has been applied to the field of pneumatic wheels. Wheels support a load and exhibit a spring rate. Lowering the spring rate of a wheel improves the vibration isolation.

Figure 9:
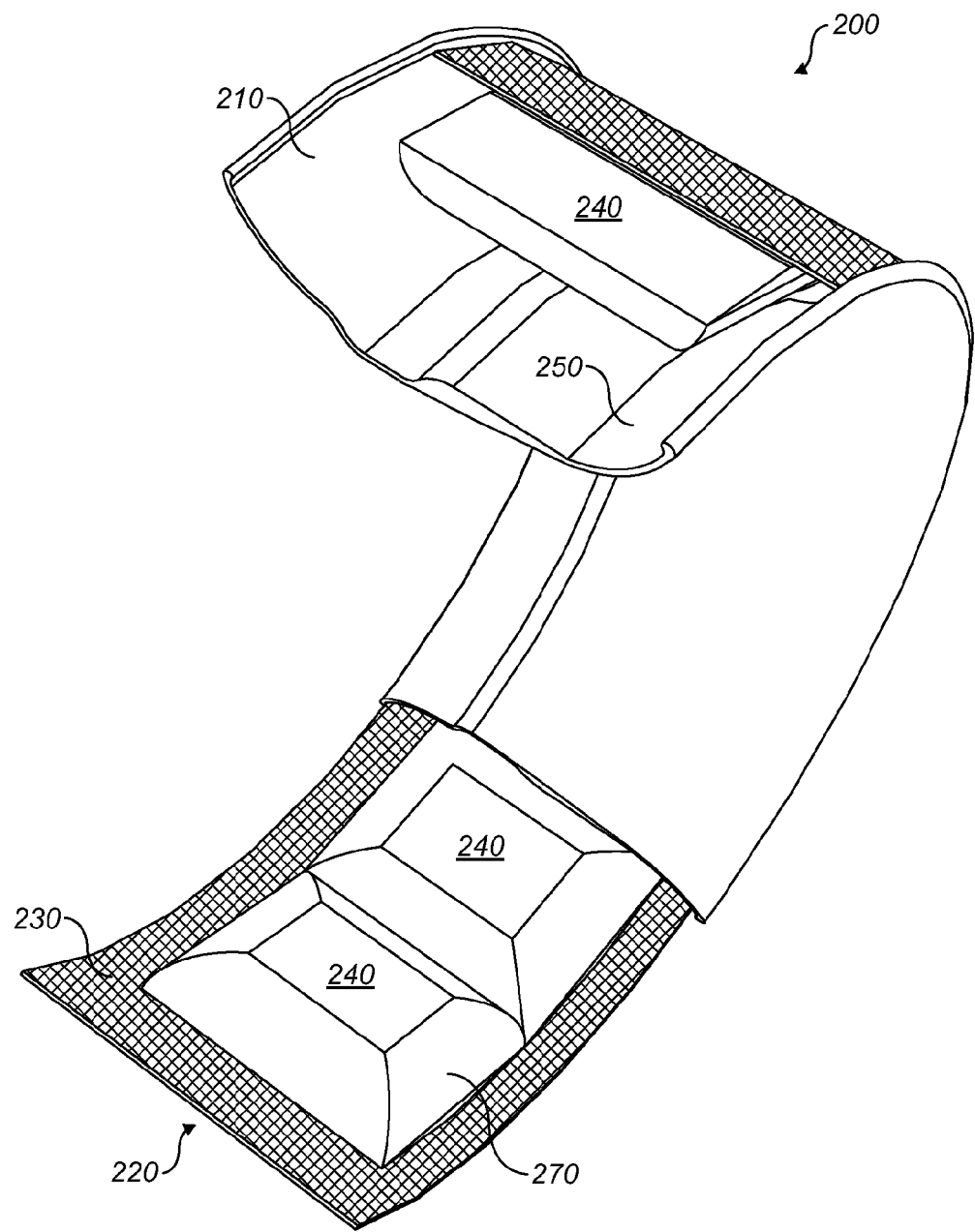
FIG. 9 is a cut-away partial perspective view of a wheel according to a seventh embodiment of the invention.

Referring to FIG. 9, the wheel 200 comprises a rim 210 which is normally arranged to receive a tyre (not shown). The tyre forms a seal with the rim 210 to create a chamber 250 and is filled with pressurised gas via a valve (not shown). The dimensions of the wheel, including the size and shape of the chamber formed by the rim 210 and the tyre, together with the tyre air pressure and materials of manufacture will determine the spring rate of the wheel 200. For example, high performance cars tend to have wide low-profile tyres that exhibit good handling characteristics, but which have a relatively high spring rate when compared to normal width and profile tyres.

According to the seventh embodiment of the invention, there is provided a mass of adsorptive material 270 contained within the chamber 250 to reduce the spring rate of the wheel 200. In particular, the mass of adsorptive material 270 is chosen to effect a desired reduction in spring rate of the wheel.

Specifically, in this seventh illustrative embodiment, the mass of adsorptive material 270 is held within the chamber 250 in an insert 220. The insert 220 comprises webbing 230 and a series of compartments 240. The compartments 240 are designed to fit against the face of the rim 210 and are designed to extend fully around the circumference of the rim 210. The webbing 230 is designed to fit across the rim 210 at a point just below where the tyre fits against the rim 210, trapping the compartments 240 in place.

The compartments 240 are made from any suitable material which allows fluid communication between the air or gas within the chamber 250 and the mass of adsorptive material.

The adsorptive material adsorbs air within the tyre when a force causes the tyre volume to be compressed, and releases or desorbs air when the tyre relaxes. This action is believed to lower the spring rate of the wheel 200, making for a more comfortable ride. Also, the handling characteristics of a wheel are maintained as the physical size of the wheel 200 remains unchanged. Also, smaller wheels can be used to do the job of larger wheels.

In a modified version of the seventh embodiment not shown in the figures, the mass of activated carbon 270 can be held in an insert 220 against the tyre itself, preferably but not exclusively on the inside of the tyre face which normally contacts the ground in use. In this way, the centrifugal forces acting against the mass of activated carbon 270 are resisted by the tyre face.

Figure 10:
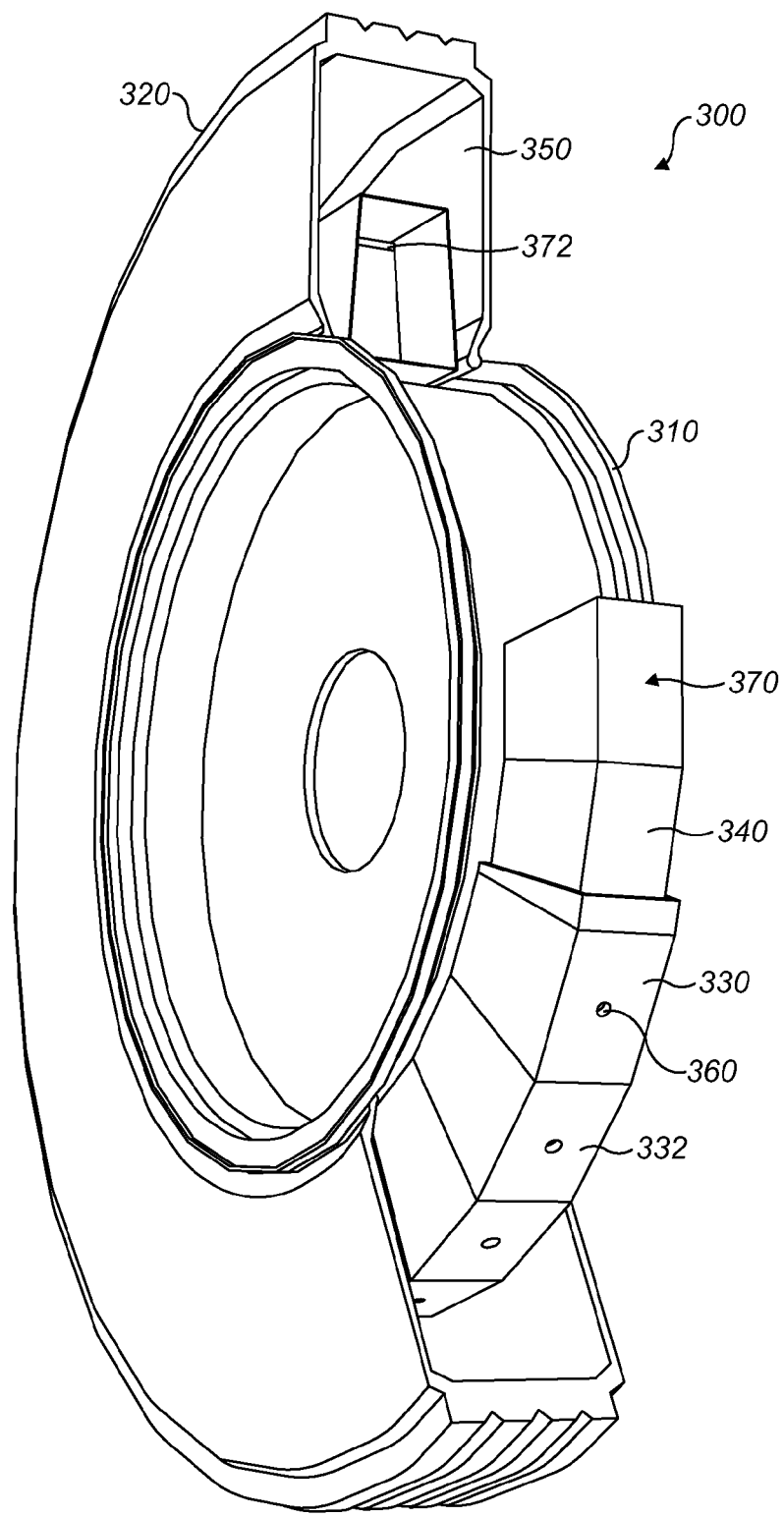
FIG. 10 is a cut-away perspective view of a run-flat wheel according to an eighth embodiment of the invention.

An eighth embodiment of the invention is described with reference to FIG. 10 which shows a cut-away view of a run-flat or zero-pressure wheel 300 typically for a tractor, truck or off-road vehicle.

The wheel 300 comprises a rim 310 and a tyre 320. Additionally, a reinforced polyurethane supporting ring 330 is attached to the rim 310 so that the ring 330 extends radially outwardly to support the tyre 320 in the event of a puncture or other loss of pressure. This arrangement is known in the art. The rim 310 and tyre 320 define a chamber 350 in which the ring 330 is located. Normally, in the art, the ring 330 reduces the air holding volume of the chamber 350 and results in a higher spring rate for the wheel 300, and therefore a harder ride.

The eighth illustrative embodiment places a mass of adsorptive material 370 in the chamber 350 to reduce the spring rate. In particular, the adsorptive material 370 is placed within the ring 330 or supporting casing. The supporting casing 330 is arranged to allow fluid communication between the adsorptive material and the chamber 350 via at least one flow passage 360 to allow adsorption and desorption of the air or gas within the chamber 350 to occur. In this example embodiment, there are provided a plurality of flow passages 360 evenly spaced around the outer circumference of the supportive casing 330. The flow passages 360 are orifices which restrict the amount of air or gas flowing into the supporting casing to be adsorbed by the adsorptive material 370. In this way, damping of any shock may also be achieved.

The adsorptive material 370 is arranged in segments 340 each having a substantially trapezoidal profile. Likewise, the supportive casing 330 is arranged in corresponding segments 332 slightly larger than the segments 340. A mesh 372 is provided between the adsorptive material 372 and each flow passage 360, to prevent the adsorptive material from entering into the chamber 350.

The wheel 300 of the eighth illustrative embodiment is often used in applications where the wheel itself acts as the suspension of the vehicle alone, and so the invention may advantageously create a softer ride despite the presence of the supporting ring 330 occupying space within the chamber 350.

Theory and Test Results

A particular form of adsorptive material, namely activated carbon, can hold up to five times its own volume of air at a given pressure through adsorption, and up to twelve times its own volume of carbon dioxide. As pressure rises, gas molecules adsorb onto the surfaces of the activated carbon granules, which have a high surface area per unit volume and contain many pores of differing scale. It is believed that when adsorbed, the molecules no longer take part in Brownian motion or contribute to pressure in a space.

Activated carbon is produced in hundreds of different grades, most commonly from coal, wood and coconut shells. The more highly activated the carbon, the higher the porosity of each grain and the lower the density. More highly activated carbons are typically more expensive. Activated carbons also come in a range of grain sizes, ranging from several millimeters down to fine powders. It is believed that the smaller the grain, the faster its rate of adsorption.

During experimentation (see FIG. 11), it was found that the pressure within a sealed container having a volume of 1 liter was noticeably reduced by the addition of activated carbon when the same volume of air was pumped into the container.

Figure 11:
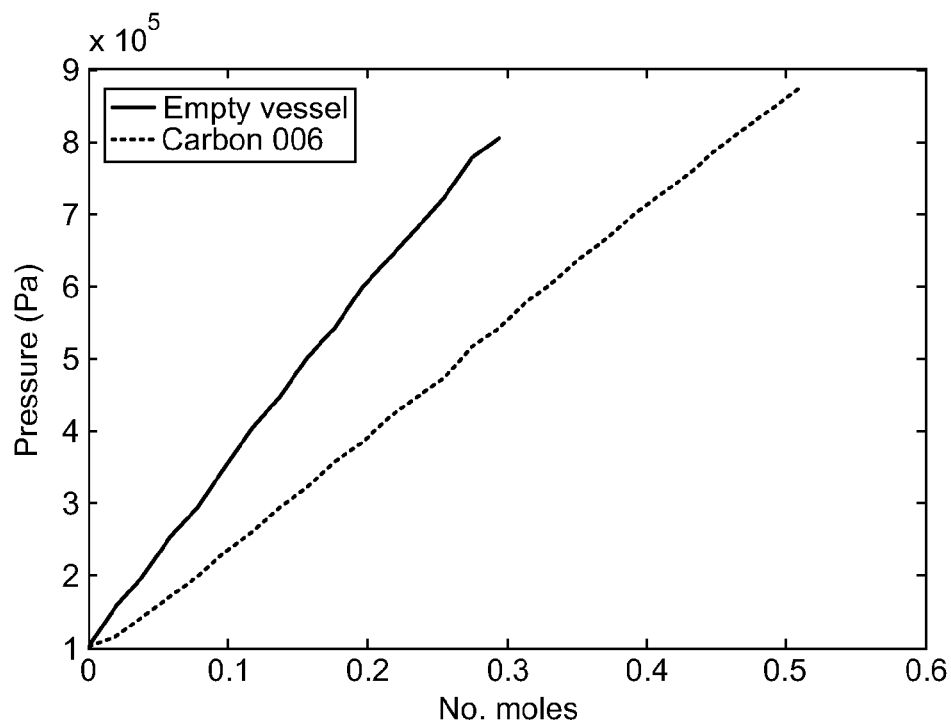
FIG. 11 shows the results of an experiment to determine the pressure versus the number of moles injected into a 1 liter sealed container empty and half-filled with an activated carbon.

For example, when half of the container was full of activated carbon type 006, the pressure increase per mole of air pumped into the chamber was significantly less than when the chamber did not contain the activated carbon. FIG. 11 shows the results of an experiment conducted as described above, using a bicycle pump which was measure to deliver 0.0098 moles of air per pump action. The atmospheric pressure was 101858 Pa, the temperature was 291.015 K and the humidity was 64%.

Since 50% of the volume of the container was taken up by a "semi-solid" granular material it is somewhat surprising that the pressure in the container increases less with every injected mole of gas compared to the empty container. For example, if the container were half filled with water a greater increase in pressure for every injected mole of gas, compared to the empty condition, would be expected.

Figure 12:
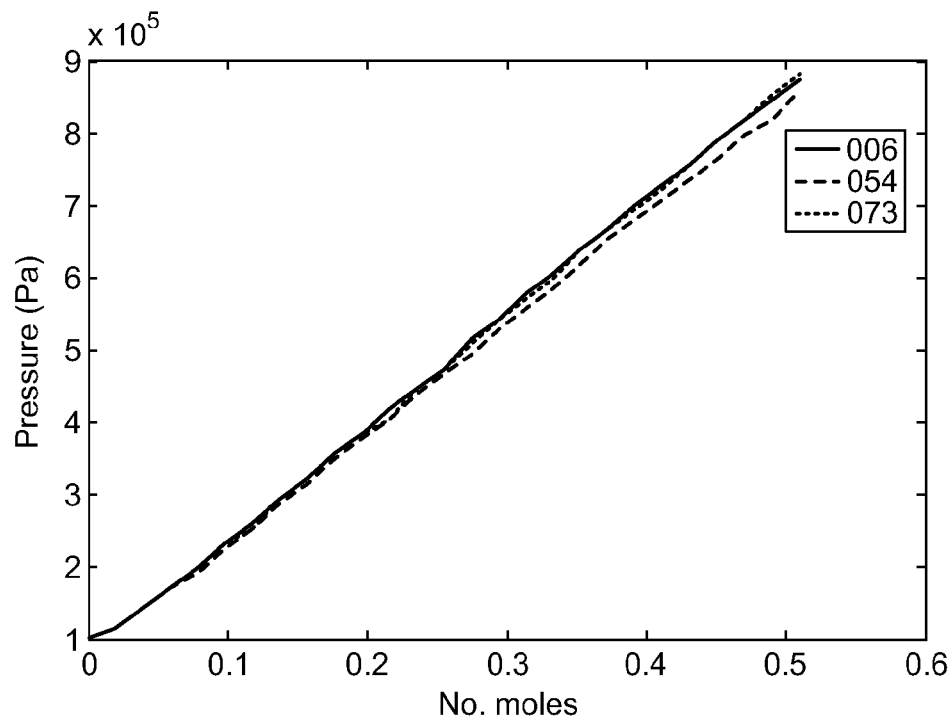
FIG. 12 shows the results of an experiment to determine the pressure versus the number of moles injected into a 1 liter sealed container half-filled with three types of activated carbon.

As mentioned above, different varieties of activated carbon exist which each vary in grain size and porosity. Three activated carbon varieties (006, 054 and 073) were tested consecutively to see if a similar effect is observed in each case. The results are seen in FIG. 12 which shows that activated carbons 006 and 073 behave similarly for these static tests. Carbon 054 however, appears to increase the effective air volume of the container slightly more than the other two activated carbons. This may be explained by the smaller grain size of carbon 054 with respect to 006 and 073 leading to closer packing.

A further experiment was conducted to measure the spring rate of a sealed volume of air, with and without the addition of the adsorptive material, in this case an activated carbon. A flask was connected to a glass cylinder and mounted to the bed of a shake table. The table was used to actuate a close-fitting plunger via a force transducer in and out in a 4 Hz sinusoidal motion within the cylinder, to an excursion of around 20 mm. The experiment was conducted with an empty flask, and then with the flask part filled with activated carbon granules.

Figure 13:
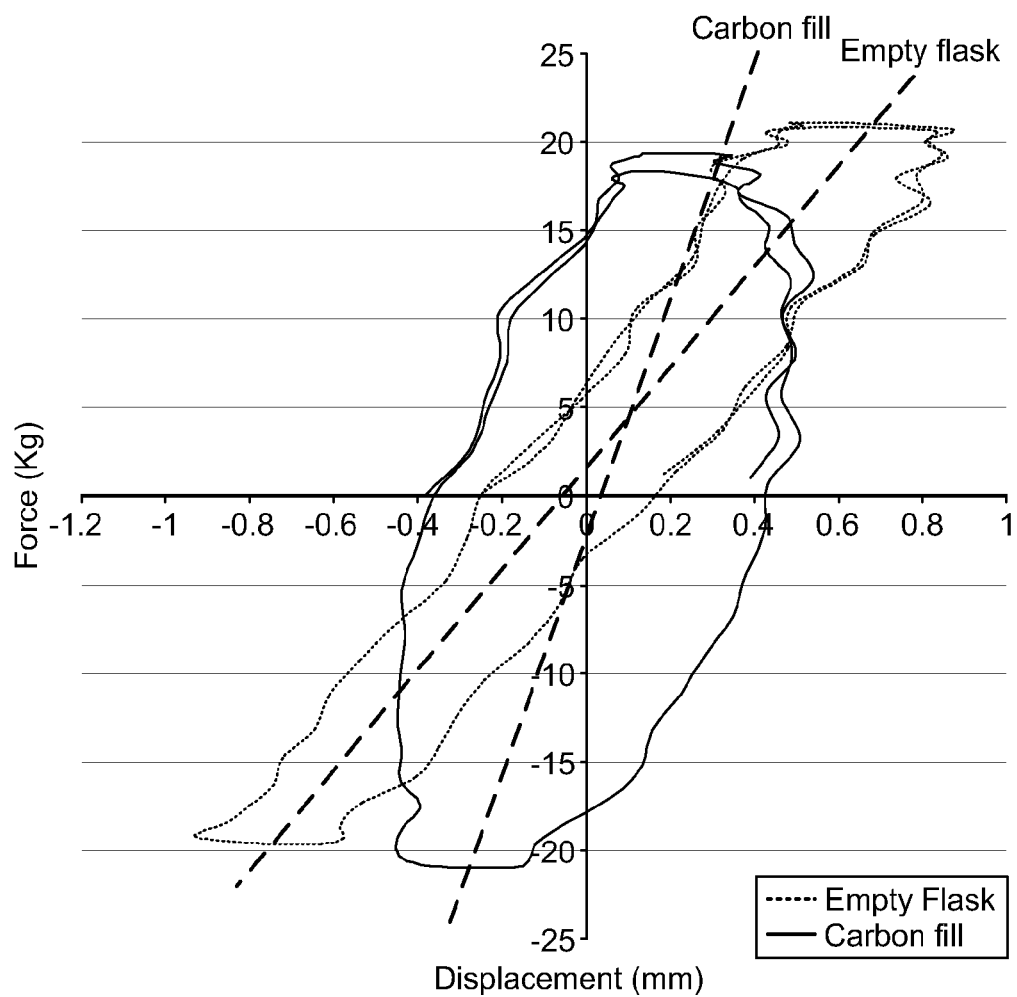
FIG. 13 shows the results of an experiment to determine the spring rate of a sealed container empty and half-filled with an activated carbon.

The force plot from the transducer is shown in FIG. 13.

The empty flask plot shows that considerable force (left to right) is experienced by the plunger with each stroke (up/down). The stroke and return loop plot is the result of damping in the experiment, caused by striction of the plunger in the cylinder, some air escape around the seal of the plunger and hysteresis in the soft and slightly rubbery mounting of the glass cylinder. The spring rate of the system is determined by the gradient of the plot (see dotted line).

The plot from the carbon-filled flask shows the spring rate has relaxed significantly, as shown by the lower force gradient with each stroke. This is counter-intuitive, as part filling the space with a material should cause the spring rate to tighten, not relax. The relaxation of the spring rate is very pronounced when actuating the cylinder by hand, particularly over a longer stroke.

Although a few preferred embodiments have been shown and described, it will be appreciated by those skilled in the art that various changes and modifications might be made without departing from the scope of the invention, as defined in the appended claims.

The invention claimed is:

1. An air spring for supporting a load, the air spring comprising:
   a chamber for holding a pressurised gas in use, and
   a load-bearing surface arranged to transmit a force from a load in use to the pressurised gas,
   wherein the chamber contains a mass of adsorptive material to lower the spring rate of the air spring and
   wherein the air spring further comprises a bellows and the chamber comprises a first sub-chamber within the bellows that has a volume that changes in use and a second sub-chamber that has a fixed volume.

2. The air spring of claim 1, wherein the adsorptive material comprises a granular material.

3. The air spring of claim 1, wherein the adsorptive material comprises an activated carbon.

4. The air spring of claim 3, wherein the activated carbon has an N2 surface area in excess of 1500 $m^2/g$.

5. The air spring of claim 1, wherein the air spring comprises a barrier to contain the adsorptive material, and the barrier allows for fluid communication between the adsorptive material and the rest of the chamber.

6. The air spring of claim 1, wherein the air spring comprises one or more restricted openings between the adsorptive material and the rest of the chamber.

7. The air spring of claim 1, wherein the chamber is pressurised and the load-bearing surface is attached to a load.

8. The air spring of claim 1, wherein the air spring is a reversible sleeve air spring.

9. The air spring of claim 8, wherein the reversible sleeve air spring comprises a piston that contains the adsorptive material.

10. The air spring of claim 9, wherein a piston lid is provided to contain the adsorptive material and allow fluid flow between the adsorptive material and the remaining chamber, and the piston lid comprises one of a gauze, a mesh, a filter grill and a flexible elastic membrane arranged to allow a net movement of gas into and out of the adsorptive material.

11. The air spring of claim 10, wherein the piston lid is an orifice plate defining an orifice, the orifice is protected from the adsorptive material by a substantially hemispherical mesh and the orifice plate comprises an orifice rivet having the hemispherical mesh attached thereto.

12. The air spring of claim 8, wherein the reversible sleeve air spring comprises a bellows, and wherein the bellows comprises a casing for the adsorptive material, and the adsorptive material is contained within the casing.

* * * * *